United States Patent [19]
Robbins

[11] Patent Number: 4,901,821
[45] Date of Patent: Feb. 20, 1990

[54] MOTOR OPERATOR FOR A STORED ENERGY OPERATING MECHANISM

[75] Inventor: W. Dale Robbins, Snellville, Ga.

[73] Assignee: Siemens Energy & Automation, Inc., Atlanta, Ga.

[21] Appl. No.: 257,483

[22] Filed: Oct. 13, 1988

[51] Int. Cl.⁴ .................. F03G 1/00; H01H 3/30; F16H 25/14
[52] U.S. Cl. .................. 185/40 R; 74/53; 74/55; 74/445; 74/567; 74/569; 200/400
[58] Field of Search .................. 74/53, 55, 445, 567, 74/569; 185/40 R; 200/318, 400

[56] References Cited
U.S. PATENT DOCUMENTS

| | | | |
|---|---|---|---|
| 780,130 | 1/1905 | Salzer et al. | 74/55 |
| 2,342,601 | 2/1944 | Pyle | 74/55 |
| 3,438,271 | 4/1969 | Cain | 74/55 X |
| 3,585,330 | 6/1971 | Bould | 185/40 R X |
| 4,475,021 | 10/1984 | Mochizuki et al. | 200/400 |
| 4,522,080 | 6/1985 | Santi | 74/445 |
| 4,742,200 | 5/1988 | Marquardt et al. | 200/325 |

*Primary Examiner*—Allan D. Herrmann
*Attorney, Agent, or Firm*—Volker R. Ulbrich; James G. Morrow

[57] ABSTRACT

A motor operated mechanism for transferring energy to the energy storing mechanism of a circuit breaker of the type which utilizes the energy to close the primary contacts of the circuit breaker. The mechanism includes a motor for driving a cam and follower assembly. The cam and follower assembly cooperate with a linkage to supply rotational motion of an energy delivery shaft, wherein the energy delivery shaft is coupled to the energy storing mechanism of the circuit breaker.

4 Claims, 5 Drawing Sheets

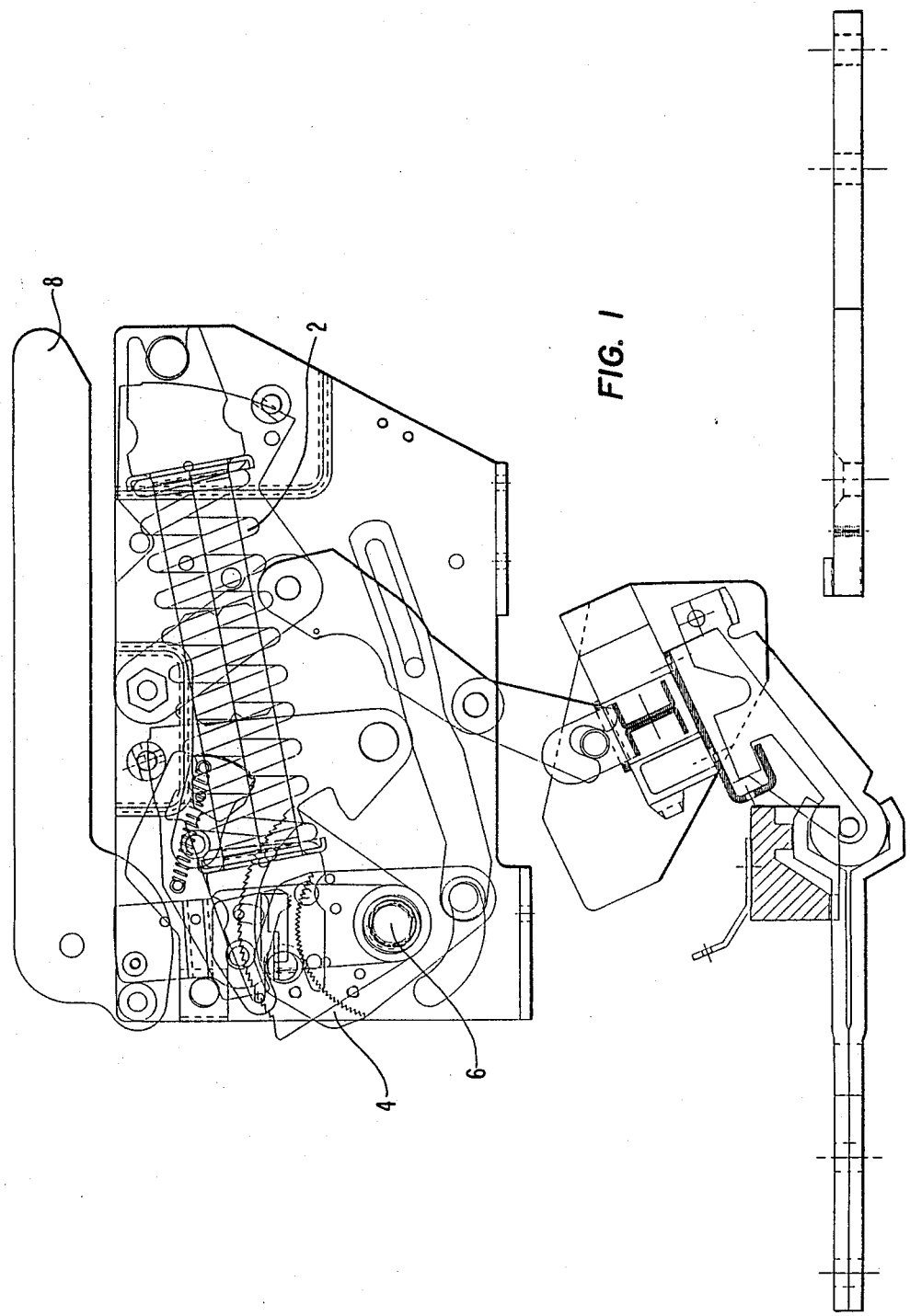

MOTOR OPERATOR FOR A STORED ENERGY OPERATING MECHANISM

CROSS-REFERENCE TO RELATED APPLICATIONS

This patent application is related to the patent applications entitled STORED ENERGY CONTACT OPERATING MECHANISM having Ser. No. 07/255,894 U.S. filed on Oct. 11, 1988 and STORED ENERGY OPERATING MECHANISM CHARGING HANDLE AND COVER ASSEMBLY having Ser. No. 07/256,356 U.S. filed on Oct. 11, 1988.

BACKGROUND OF INVENTION

This invention relates to a circuit breaker, and more particularly, to a motor operated device for supplying energy to the energy storing device for the contact operating mechanism of a circuit breaker.

The patent application entitled STORED ENERGY OPERATING MECHANISM CHARGING HANDLE AND COVER ASSEMBLY discloses a means for supplying energy to an energy storing device through manual operation, but for certain applications, such as remote control operation of a circuit breaker, this means for supplying energy is not convenient.

Motor operated apparatus for supplying energy to the energy storing device of a circuit breaker are known. For example, U.S. Pat. No. 4,475,021 provides for a circuit breaker which comprises, in combination, a rotational shaft connected with a motor, a cam which rotates in one direction through a ratchet by a handle operation to accumulate energy in an energy accumulating spring for contact closure, an engaging part provided on the outer periphery of said rotational shaft, and a latch which slides on and along the engaging part of said rotational shaft when said cam is rotated by said handle operation, and which causes said cam to rotate together with said rotational shaft in engagement with said engaging part of said rotational shaft when said rotational shaft is rotated in one and the same direction by said motor.

Since many circuit breakers can be used without a motor operated apparatus for supplying energy, it is economical to provide a basic circuit breaker which does not include any of the components required for the motor operated apparatus. Thus, the cost for a basic circuit breaker can be reduced by the cost of the components required for the motor operated apparatus. Additionally, the difference in cost between a circuit breaker with a motor operated apparatus and a circuit breaker without will more accurately reflect the cost of the motor operated apparatus.

SUMMARY OF THE INVENTION

An object of the present invention is to provide a motor operated assembly for supplying energy which is substantially self contained.

Accordingly, there is provided a mechanism for supplying energy to a circuit breaker of the type including means for storing energy and a transfer shaft for transferring energy to the means for storing energy. The mechanism for supplying energy comprises a support means, a first shaft rotatably supported by the support means and adapted to be coupled to the transfer shaft, a second shaft rotatably supported by the support means, a cam supported by the second shaft, a motor for producing rotational motion, means for transferring the rotational motion of the motor to the second shaft, and a cam follower assembly. The cam follower assembly is adapted to cooperate with the cam and the first shaft such that the rotational motion of the second shaft causes the first shaft to rotate.

An advantage of the present invention is that it provides a motor operated assembly for supplying energy which is readily combined with a basic circuit breaker.

Various other objects and advantages of the present invention will become apparent from the following description, with reference to the accompanying drawing.

BRIEF DESCRIPTION OF THE DRAWINGS

FIG. 1 is a side view of a circuit breaker wherein the primary contacts are open and the charging springs of the stored energy mechanism are not charged;

DETAILED DESCRIPTION OF THE PREFERRED EMBODIMENT

Figure 2A:
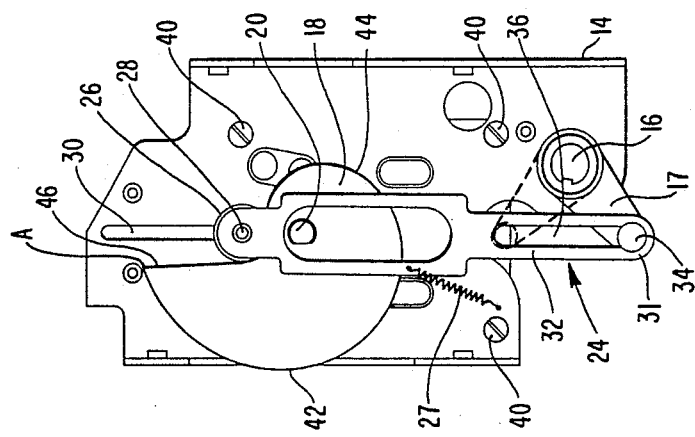
FIG. 2a is a right side view of the motor operator with the right support plate removed.

Referring now to the drawings, FIG. 1 illustrates an embodiment of a stored energy contact operating mechanism, the details of which are disclosed in the patent application referenced above entitled STORED ENERGY CONTACT OPERATING MECHANISM. In this embodiment of the mechanism, two springs 2 can be compressed to store energy. The springs 2 are compressed by two charging blocks 4 which are fixed to, and rotate clockwise on, a shaft 6 to compress the springs 2. The energy used to rotate the charging blocks 4 can be supplied by a pivotable charging handle 8, the details of which are disclosed in the patent application referenced above entitled STORED ENERGY OPERATING MECHANISM CHARGING HANDLE AND COVER ASSEMBLY.

As with the charging handle 8, the preferred embodiment of the motor operator also provides a mechanism for providing energy to rotate the charging blocks 4. FIGS. 2–2b illustrate the preferred embodiment of the motor operator. The motor operator includes a motor 10, a right support plate 12, a left support plate 14, a drive arm 17, a cam 18, a cam shaft 20, gear box 22 and a cam following linkage 24.

The drive arm 17 of the motor operator is coupled to the shaft 6 of the stored energy contact operating mechanism by means of the shaft receptacle 16 in the drive arm 17, such that when the drive arm 17 is rotated, the shaft 6 is also rotated. Accordingly, when the drive arm 17 is rotated clockwise, the charging blocks 4 are also rotated clockwise such that the springs 2 are charged (compressed).

The energy for rotating the shaft 6 clockwise is supplied by the motor 10. The motor 10 is coupled to a gear box 22 which rotates the cam shaft 20. The gear box 22 is configured such that the torque of the motor 10 is multiplied and the rotational speed of the cam shaft 20 is reduced below that of the motor 10. The cam shaft 20 is supported by the gear box 22 and the support plates 12, 14.

A cam and linkage assembly is provided to transfer the rotational energy of the motor 10 from the gear box 22 to the drive arm 17. A cam 18 is fixed to the cam shaft 20 and cooperates with a cam following roller 26 such the roller bearing pin 28 translates along slots 30 in the support plates 12, 14. The roller bearing pin 28 is supported by the slots 30 and passes through the link members 32.

The link members 32 are provided with slots 36 within which a link pin 34 can translate. The link pin 34 supports the link members 32 at the drive arm 17. When the cam 18 is rotated counter-clockwise (see FIG. 2a), the roller 26 causes the cam following linkage 24 to move such that the slot end 31 interacts with the link pin 34 to rotate the drive arm 17 and the shaft 6. The tension springs 27 function to urge the roller 26 against the cam 18, and return the cam follower linkage 24 to its initial position. When the cam 18 has made full revolution, and the shaft 6 has been rotated to charge the springs 2, the drive arm 17 is positioned as shown by dashed lines in FIG. 2a. When the springs 2 are discharged, the slot 36 allows the drive arm 17 and shaft 6 to freely move back to their original position as shown by the solid lines in FIG. 2a.

Figure 2:
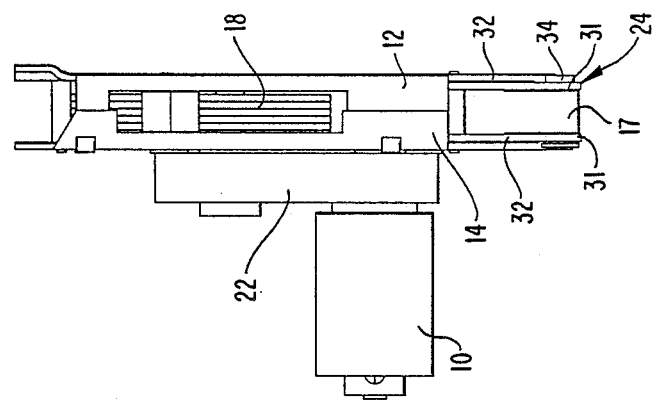
FIG. 2 is a top view of the motor operator.
Figure 2B:
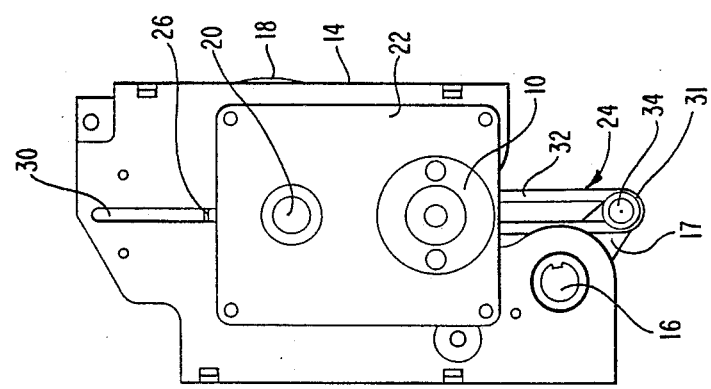
FIG. 2b is a left side view of the motor operator.
Figure 3A:
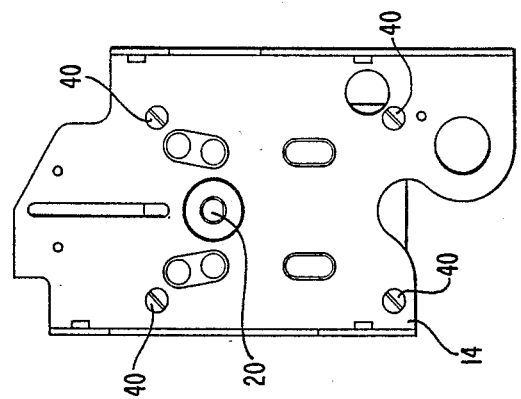
FIG. 3a is a right side view of the motor operator in FIG. 3.
Figure 3:
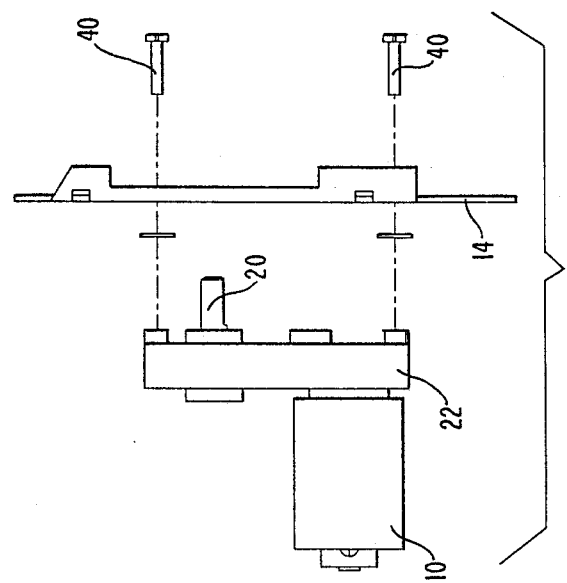
FIG. 3 is a top view of the motor operator with the right support plate removed, the cam removed and the linkage removed.
Figure 3B:
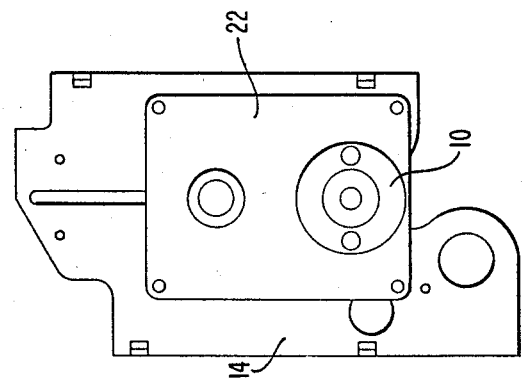
FIG. 3b is a left side view of the motor operator in FIG. 3.
Figure 4:
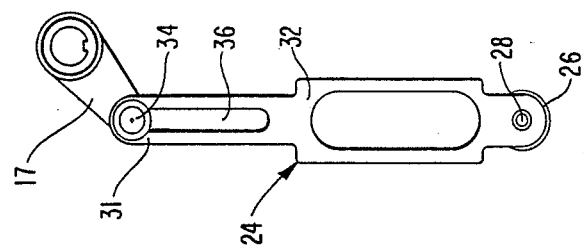
FIG. 4 is a side view of the motor operator linkage.
Figure 4A:
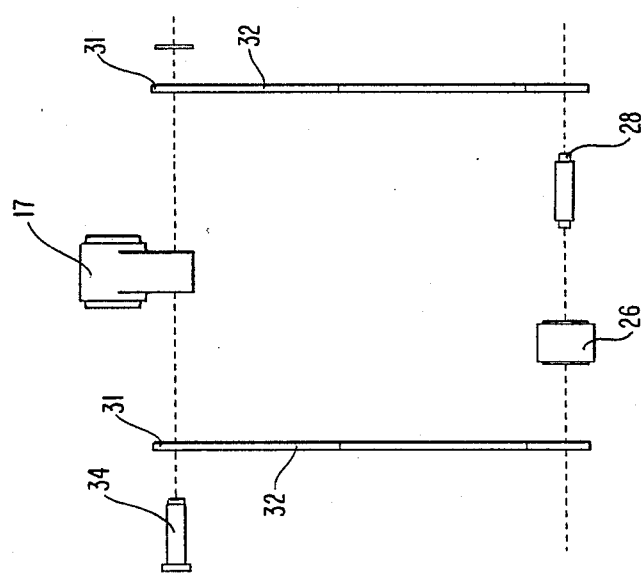
FIG. 4a is an exploded top view of the motor operator linkage.
Figure 5:
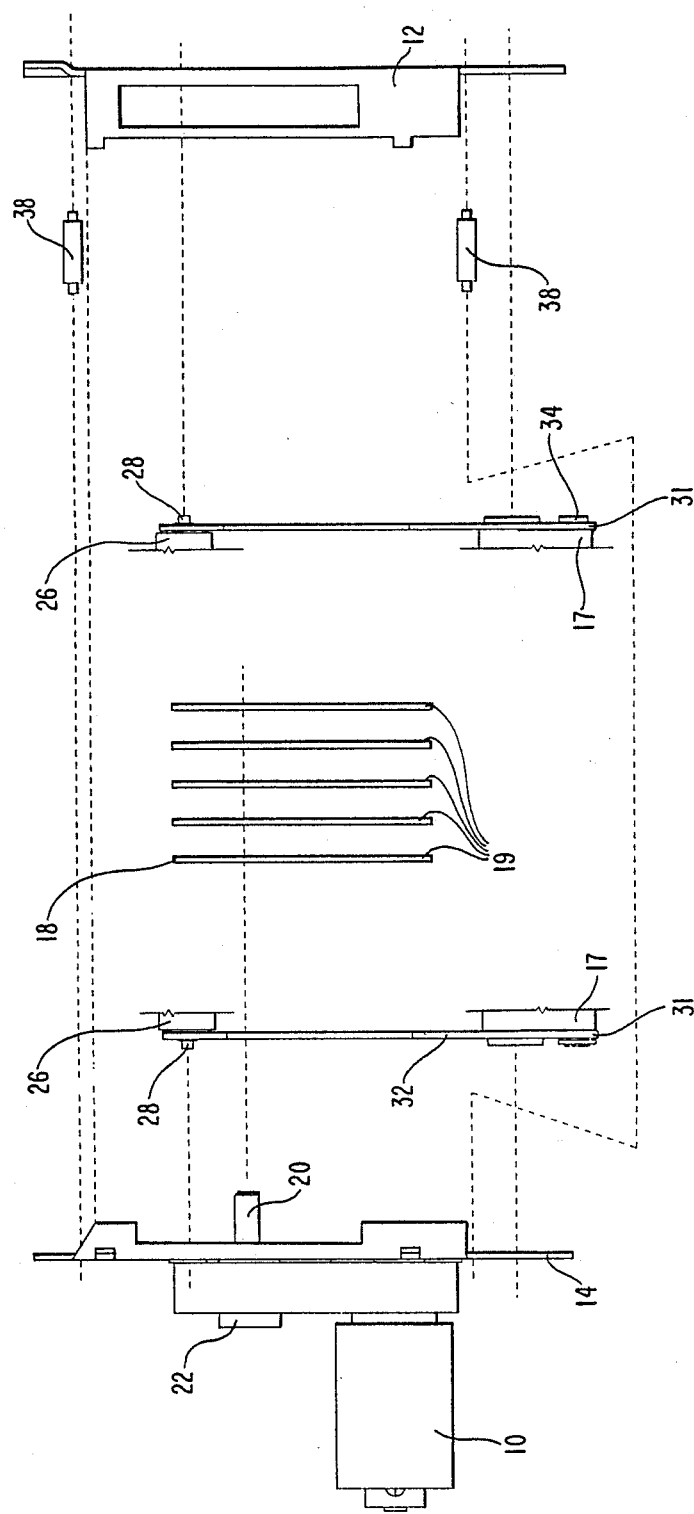
FIG. 5 is an exploded top view of the motor operator.

FIG. 2a illustrates the preferred configuration of the cam surface 42 which includes a rise portion 44 and return portion 46. When the cam 18 is rotated and the roller 26 is in contact with the cam 18, the rise portion 44 of the cam 18 cooperates with roller 26 such that the cam shaft 20 is subjected to a substantially constant torque. At point A, the cam surface 42 has a transition between the rise portion 44 and the return portion 46. At point A the roller 26 returns along the return portion to the beginning of the rise portion 44 and the cam following linkage 24 is biased by spring 27 to its 24 original position.

By way of example, the support plates 12, 14 can be properly supported by spacing the plates 12, 14 with spacers 38 and fixing them 12, 14 to the gear box 22 with fasteners 40. Additionally, for ease of manufacture, the cam 18 can be fabricated from a plurality of stamped plates 19 fastened together to form the appropriate width cam 18.

While one embodiment of a motor operator has been shown and described in detail herein, various other changes and modifications may be made without departing from the scope of the present invention.

I claim:

1. A mechanism for supplying energy to a circuit breaker of the type including means for storing energy and a transfer shaft for transferring energy to the means for storing energy, the mechanism for supplying energy comprising:
   a support means;
   a first shaft adapted to be coupled to the transfer shaft, wherein the first shaft is rotatably supported by the support means;
   a second shaft rotatably supported by the support means;
   a cam supported by the second shaft;
   a motor for producing rotational motion;
   means for transferring the rotational motion of the motor to the second shaft;
   a member including a slot and a cam follower, wherein the member is slidably supported by the support means such that contact between cam follower and cam is maintainable;
   an arm including an extension slidably engaging the slot, wherein the arm is fixed to the first shaft; and
   means for maintaining the cam follower in engagement with the cam;
   the cam including a cam surface having a rise portion followed by a return portion which drops back to the beginning of the rise portion,
   the extension engaging the slot such that:
   the arm rotates the first shaft from a first position to a second position when the cam is rotated and the cam follower is in contact with the rise portion;
   the arm does not rotate the first shaft when the cam is rotated and the cam follower is in contact with the return portion; and
   the arm does not rotate the first shaft when the shaft is in the second position.

2. The mechanism of claim 1, wherein the means for transferring the rotational motion of the motor to the second shaft comprises a gear train.

3. The mechanism of claim 1, wherein the support means includes two side plates mounted in a side-by-side configuration.

4. The mechanism of claim 1, wherein the cam comprises a plurality of plates each having the same cam surface, wherein the plates are fixed together to form the cam.

* * * * *